US009121956B2

(12) United States Patent
Flynn et al.

(10) Patent No.: US 9,121,956 B2
(45) Date of Patent: Sep. 1, 2015

(54) METHOD AND APPARATUS FOR DETERMINING A LOCATION TO ACQUIRE GEOPHYSICAL DATA

(75) Inventors: Desmond John Flynn, Edinburgh (GB); Thomas Cheriyan, Sugar Land, TX (US); John Edward Grant, Livingston (GB); Stuart Maxwell Darling, Glasgow (GB)

(73) Assignee: ION GEOPHYSICAL CORPORATION, Houston, TX (US)

( * ) Notice: Subject to any disclaimer, the term of this patent is extended or adjusted under 35 U.S.C. 154(b) by 575 days.

(21) Appl. No.: 13/479,173

(22) Filed: May 23, 2012

(65) Prior Publication Data
US 2012/0300583 A1  Nov. 29, 2012

Related U.S. Application Data

(60) Provisional application No. 61/489,040, filed on May 23, 2011.

(51) Int. Cl.
G01V 1/38 (2006.01)
G01V 1/00 (2006.01)

(52) U.S. Cl.
CPC .............. G01V 1/003 (2013.01); G01V 1/3808 (2013.01)

(58) Field of Classification Search
CPC .......................... G01V 1/003; G01V 1/13808
USPC ............................................... 367/15; 702/14
See application file for complete search history.

(56) References Cited

U.S. PATENT DOCUMENTS

| 4,759,636 | A | * | 7/1988 | Ahern et al. ............... 367/21 |
| 5,790,472 | A | | 8/1998 | Workman |
| 5,920,828 | A | | 7/1999 | Norris |
| 6,148,264 | A | | 11/2000 | Houck |
| 6,182,014 | B1 | | 1/2001 | Kenyon |
| 6,311,131 | B1 | | 10/2001 | Peardon |
| 7,400,552 | B2 | | 7/2008 | Moldoveanu |
| 7,778,109 | B2 | | 8/2010 | Storteig |
| 2003/0193837 | A1 | | 10/2003 | Rommel |
| 2004/0008175 | A1 | | 1/2004 | Elder |
| 2004/0125697 | A1 | | 7/2004 | Fleming |
| 2004/0230379 | A1 | | 11/2004 | Houck |
| 2005/0060097 | A1 | | 3/2005 | Pramik |
| 2006/0268662 | A1 | | 11/2006 | Rekdal |
| 2010/0002537 | A1 | | 1/2010 | Welker |

OTHER PUBLICATIONS

"PCT International Search Report and Written Opinion dated Apr. 26, 2013", PCT Application No. PCT/US2012/039210, 16 pages.

* cited by examiner

*Primary Examiner* — Mark Hellner
(74) *Attorney, Agent, or Firm* — Dorsey & Whitney LLP

(57) ABSTRACT

Methods, apparatuses, and systems are disclosed that assist in determining a location to acquire seismic data. In one embodiment, a method includes modeling acquisition of seismic data in a first location based on a first factor that impacts acquisition of seismic data in the first location. The method also includes generating a modeled attribute based on the modeling, and determining whether to acquire seismic data in the first location based on the modeled attribute or the first factor.

38 Claims, 8 Drawing Sheets

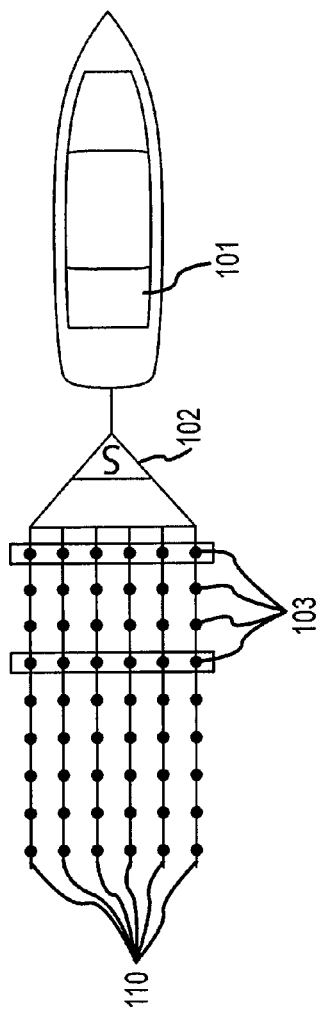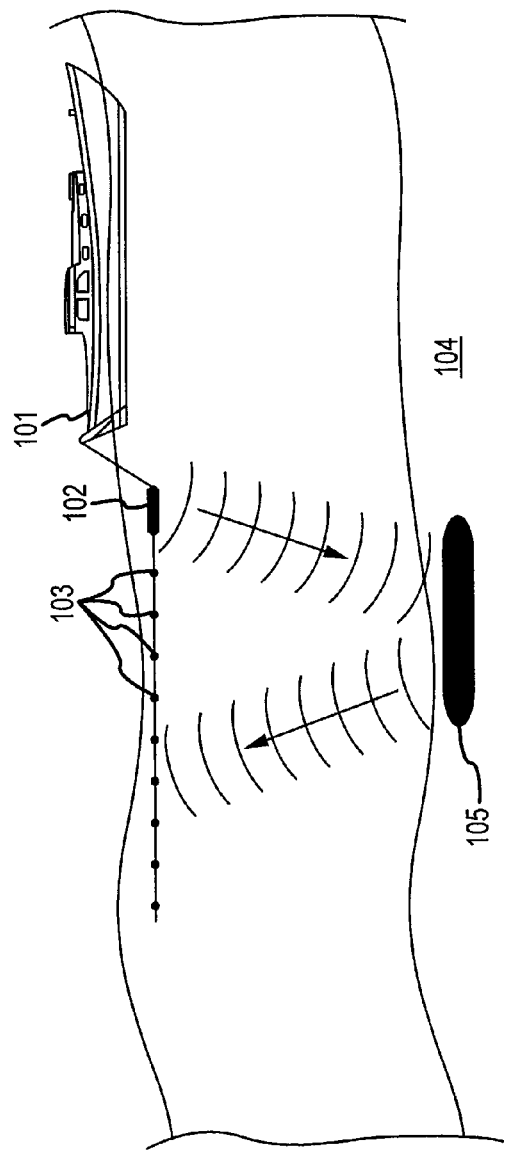
FIG.1A
FIG.1B

METHOD AND APPARATUS FOR DETERMINING A LOCATION TO ACQUIRE GEOPHYSICAL DATA

CROSS REFERENCE TO RELATED APPLICATIONS

This application claims priority to and the benefit of U.S. provisional application No. 61/489,040 filed on May 23, 2011 entitled "Method and Apparatus for Determining a Location to Acquire Geophysical Data," which is hereby incorporated by reference in its entirety for all purposes.

TECHNICAL FIELD

This disclosure relates generally to geophysical exploration systems, and more particularly to strategic data acquisition in geophysical surveys.

BACKGROUND

Petrochemical products such as oil and gas, are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers (e.g., geophones, hydrophones, accelerometers, etc.). By observing the reflected seismic signals detected by the receiver(s) during the survey, the geophysical data pertaining to reflected signals may be acquired and these signals may be used to help create an image of the subsurface of the earth and/or to indicate the composition of the Earth proximate to the survey location.

Geophysical exploration surveys are often conducted over large areas of land or water, often tens, hundreds, or even thousands of square miles. Traditionally, marine surveys are conducted in a "racetrack" manner, where a vessel acquires seismic data in relatively straight sail lines; for example, a vessel may acquire a first portion of seismic data by traveling directly southbound along a first line, turn (thereby displacing the vessel either east or west), acquire a second portion of seismic data by traveling northbound along a second line, turn again (again displacing the vessel to the east or west), acquire a third portion of seismic data by traveling along a southbound third line, and so forth; leaving a trail reminiscent of a racetrack. The racetrack methodology theoretically allows a vessel to cover the most area in the least amount of time.

During acquisition, many factors impact the quality of the data that is acquired and the time that it takes to acquire the data. For example, again in the marine context, sea currents, bad weather, swell noise, seismic interference, other vessels in the area, equipment problems, and so forth, may cause imperfections or anomalies in the acquired data. In some instances, data may not be collected at all for certain coordinates (because, for example, sea currents pushed a seismic receiver out of its intended path), or the data may have so much noise or other problems so as to be unusable. In these cases, the holes in data coverage may need to be rectified by conducting "infill," which may involve a repeat trip by a vessel to the same area. Since conventional geophysical seismic surveys often cost thousands or tens of thousands of dollars per hour to complete, repeating the survey to infill data can be costly. Therefore, methods and apparatuses are desired that facilitate determination of locations to acquire data in order to increase the quality of data acquired and reduce costs associated with conducting the surveys.

BRIEF DESCRIPTION OF THE DRAWINGS

FIG. 1A illustrates a top view of a vessel towing a seismic source and a plurality of seismic receivers positioned along streamers behind the vessel.

FIG. 1B illustrates a side view of the vessel and streamers of FIG. 1A.

SUMMARY

Figure 2:
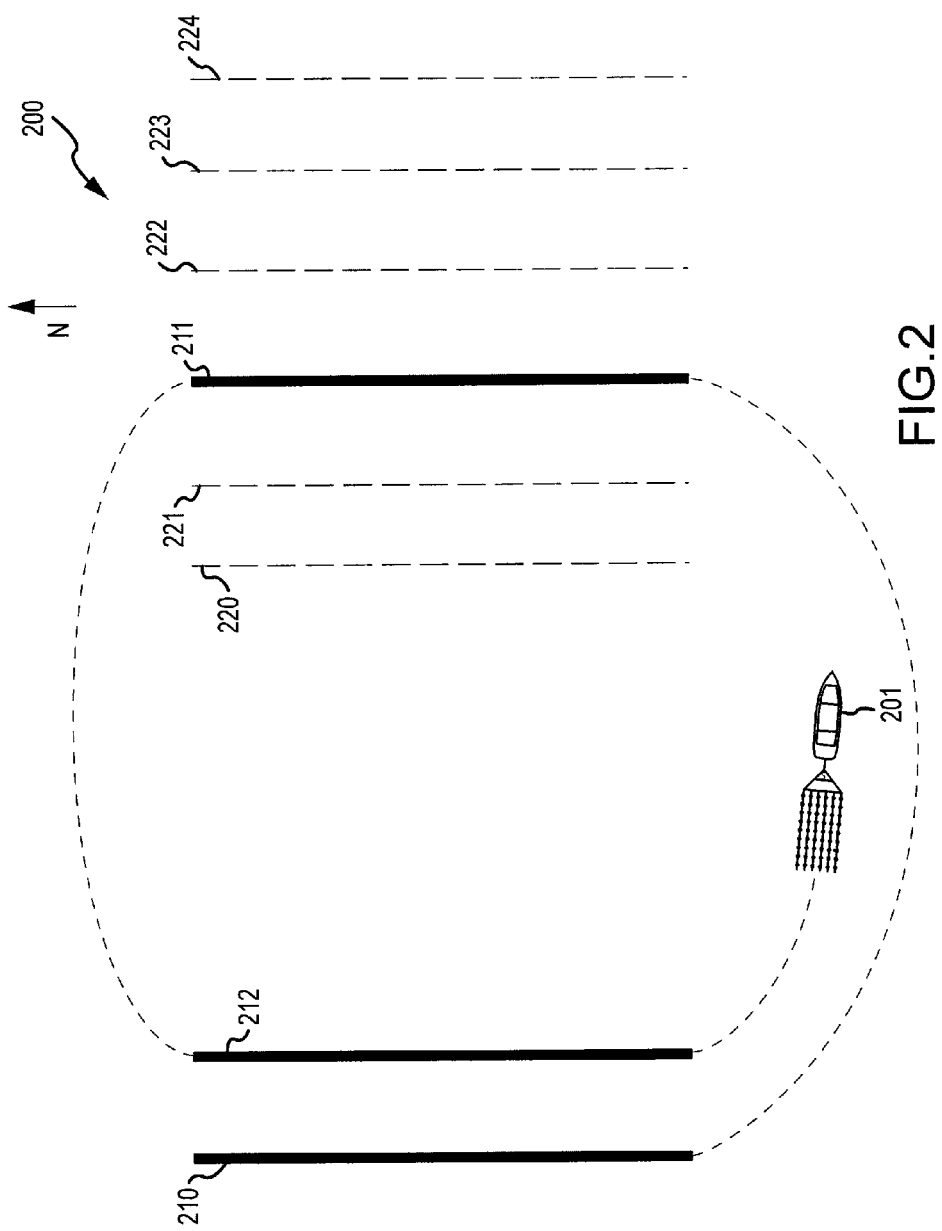
FIG. 2 illustrates a top view of a vessel acquiring seismic data in a racetrack manner.

In one embodiment, a sample method includes modeling acquisition of seismic data in a first location based on a first factor that impacts acquisition of seismic data in the first location. A modeled attribute is generated based on the modeling, and it is determined whether to acquire seismic data in the first location based on the modeled attribute or the first factor.

In another embodiment, a sample method includes modeling acquisition of seismic data in a first location based on a first factor that impacts acquisition of seismic data in the first location. The method further includes quantifying a first benefit of acquiring seismic data in the first location based on the modeling, and determining whether to acquire seismic data in the first location based on the first benefit.

In another embodiment, a sample method includes predicting a first factor that impacts acquisition of seismic data in a first location. The method further includes modeling acquisition of seismic data in the first location, the modeling reflecting the first factor. The method further includes determining whether to acquire seismic data in the first location based on the predicted first factor or based on the modeling.

In another embodiment, a sample method includes acquiring seismic data in a first location according to an acquisition plan and recording a portion of seismic data and corresponding positional data representative of the first location. The method further includes calculating quality control data corresponding to the portion of seismic data recorded and spatially displaying information representative of the quality control data based on the positional data. The method further includes determining whether to alter the acquisition plan based on the information displayed.

DETAILED DESCRIPTION

FIG. 1A shows a bird's eye view of a vessel 101 towing a source 102 and several receivers 103 on streamers 110 behind the vessel 101. FIG. 1B shows a side-view of the vessel 101 shown in FIG. 1A with the source 102 and receivers 103 being towed behind the vessel 101 beneath the surface of the water. For the sake of discussion, the embodiment depicted in FIGS. 1A and 1B illustrates the source and receiver being towed by the same vessel, however, other combinations are possible. For example, in other embodiments, either the source and/or receivers may be towed by separate vessels or may be implemented in land-based acquisition systems. In still other embodiments, the source and/or receivers may be stationary while the other is towed behind the vessel. Furthermore, although not specifically shown, in some embodiments, the receivers 103 may be positioned relatively deep within the water, for example, by using streamer steering devices, such as the DigiFIN® brand steering device available from ION Geophysical Corporation. For the sake of discussion, the following description focuses primarily on seismic data acquired by vessel-towed streamers 110 in marine environments. However, as mentioned, the concepts described herein apply more generally to, for example, land-based systems, ocean bottom cable systems, and so forth.

During operation, the source 102 may emit or "fire" seismic energy (e.g., through an air gun), which may reflect off various portions of the Earth 104 and may be received back at the receivers 103 along the streamers 110. The signal received and processed at the receivers 103 may indicate the composition of various portions of the Earth 104 proximate the location where the signal was reflected, for example an oil and/or gas reservoir 105. In some embodiments, the signal received at the receivers 103 is transmitted to a storage medium on the vessel 101 towing the receivers 103 for storage. The received and stored signal may, in some embodiments be processed by computers or servers on-board the vessel 101 in real-time, near real-time, or in some cases may not be processed at all on-board but simply recorded for processing at a later time.

FIG. 2 is an aerial view 200 of a vessel 201 acquiring seismic data in a "racetrack" manner. The seismic data may be acquired along sail lines, each of which may be a planned course for the vessel 201 to travel along. Sail lines may in some cases be referred to as lines or sequences; alternatively, in some cases, sequence may refer to the seismic data recorded during acquisition when the vessel 201 travels substantially along a sail line. With reference to FIG. 2, completed lines (e.g., lines along which seismic data has already been acquired) are indicated in bold, whereas potential target lines are represented in FIG. 2 as long dashes. The vessel 201 in FIG. 2 may have initially acquired data along line 210 while traveling in a southbound direction, then turned left 180 degrees (as shown by the small dashes) and acquired data along line 211 while traveling in a northbound direction. Then the vessel may have turned left 180 degrees again and acquired seismic data along line 212.

After acquiring data along line 212, the vessel 201 may have many potential target lines along which to acquire seismic data, such as lines 220, 221, 222, 223, and 224 in FIG. 2. Or in some instances, the vessel 201 may need to acquire infill data along line 211 in order to, for example, infill incomplete or poor-quality data. The paths traveled by the vessel and potential target lines 220, 221, 222, 223, 224 in FIG. 2 are merely given as one example, and many other paths are possible. For example, the vessel 201 may acquire seismic data along lines that run east-to-west and west-to-east, along lines that are at a diagonal to magnetic north, or along circular lines or other shapes of lines that are not necessarily straight. Also, the potential target lines may be anywhere, and are not necessarily limited to lines parallel and/or nearby the already acquired lines. For example, in FIG. 2, additional potential target lines may run east-to-west, or at a diagonal from magnetic north, or the potential target lines may be in a location several miles or even hundreds of miles away from the already acquired lines.

Figure 6:
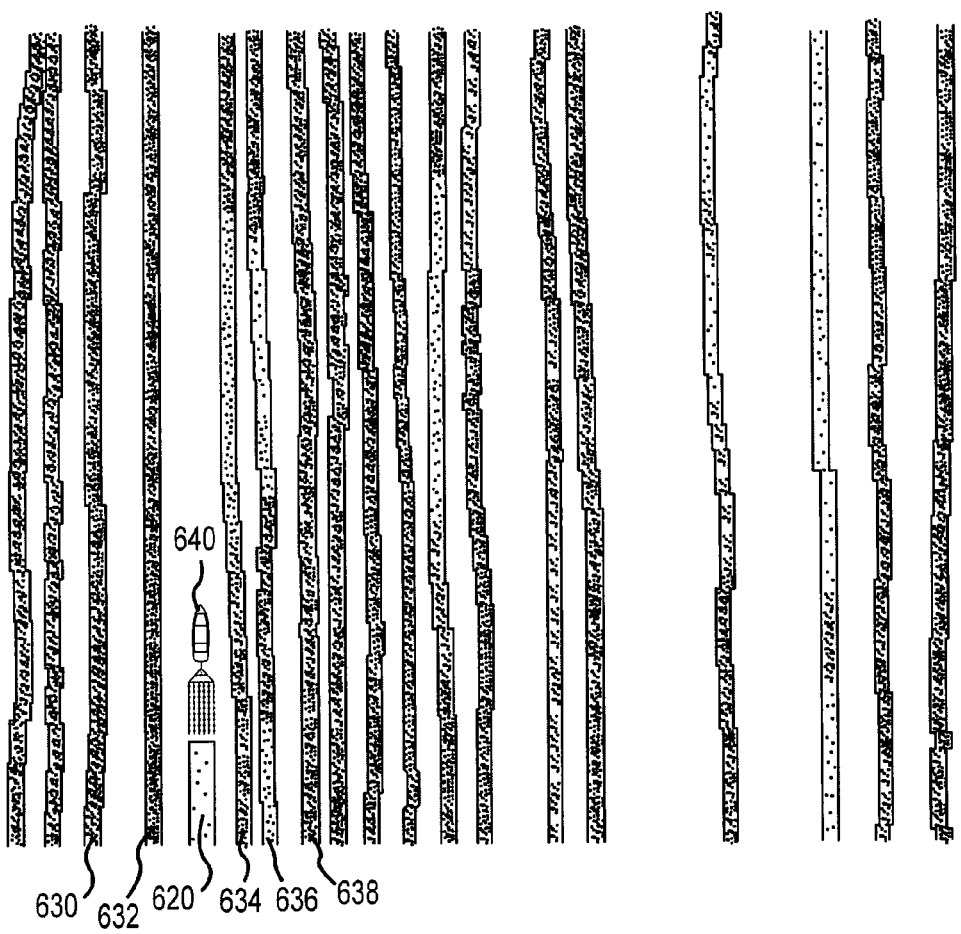
FIG. 6 illustrates a spatial plot of already acquired seismic data as well as the beginning of a line of data that a vessel is in the process of acquiring.

Although the lines in FIG. 2 are relatively straight, it will be appreciated that the actual travel path of the vessel 201 may vary from the intended sail line, and thus the completed lines may not be completely straight (see, e.g., FIG. 6).

Figure 3:
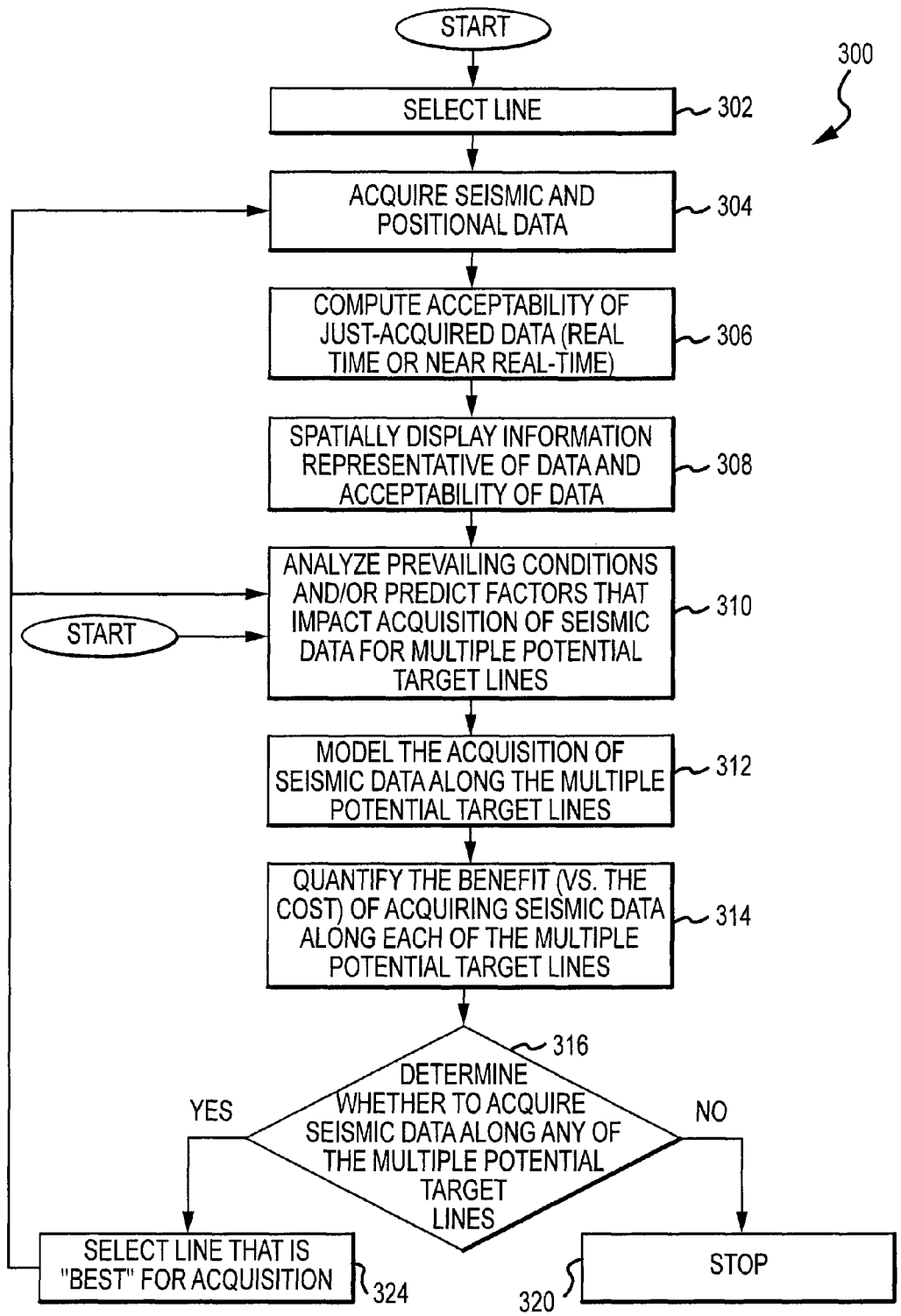
FIG. 3 is a flowchart of a method for determining a location to acquire seismic data.

FIG. 3 is a flowchart illustrating a system and method for determining a location to acquire seismic data. Operations 300 may, for example, facilitate determining which, if any, of the potential target lines 220, 221, 222, 223, 224 in FIG. 2 the vessel 201 should travel along in order to acquire seismic data after completing acquisition (or even during acquisition) along line 212. The operations described below in connection with FIG. 3 may incorporate analysis of prevailing conditions as well as prediction of future conditions in order to determine or plan specific locations for acquiring seismic data. This may allow a user or an automated system to assess the likely acquisition success before any specific line is actually acquired by modeling the potential acquisition of seismic data along a plurality of lines, and may also allow a user or system to predict the likely seismic image quality to be obtained during acquisition as well as to predict an estimated length of time that it will take to acquire seismic data along each of the plurality of lines. This in turn may allow a user or system to improve the efficiency and effectiveness of a seismic data acquisition survey and potentially reduce its cost.

The operations 300 may begin at operation 302 or may alternatively begin at operation 310, each of which is described in more detail below. In operation 302, a line is selected along which to acquire seismic data. The line may be selected based on many different factors, such as, for example, a general area in which a survey is needed, customer requirements, based on holes/gaps in previously acquired data, and so forth. In other examples, any type or shape of location in general may be selected; a line is just one example of a location along which seismic data can be acquired. Once a line is selected in operation 302, the seismic survey begins and seismic data is acquired in operation 304. Both seismic and positional data is measured, and this data is recorded in a storage medium that may, for example, be on the vessel towing the streamers (or, as another example, in a storage facility in a land-based seismic survey). As discussed above in connection with FIGS. 1A and 1B, the survey may progress with seismic sources emitting seismic energy at certain intervals, and seismic receivers recording the seismic energy reflected off the sub-surface of the earth.

Once the survey is underway and seismic and positional data is being recorded, the acceptability of the just-acquired or presently being acquired data may be computed in operation 306. This computation(s) may proceed in real-time or in near real-time. Near real-time may be within 1 minute, 10 minutes, 40 minutes, or even an hour or more after the data is acquired. In some embodiments, the computation(s) proceeds as the data is being acquired along a line, while in other embodiments, the computation(s) does not begin until acquisition of data along an entire line is complete. Also, in some embodiments, the acceptability computations may not proceed until data along several different lines has been acquired so as to provide more context information with which to judge the acceptability of the data. In other embodiments, however, the acceptability computations begin during acquisition of the data along the very first line. In some embodiments, however, operation 306 may be skipped entirely.

Once the acceptability computations are performed in operation 306 (or as they are being processed), information representative of the acquired data and/or the acceptability of that data may be displayed in operation 308. In some embodiments, this display may be spatial, i.e. an aerial-type view of the bin grid. Also, in some embodiments, information representative of data acquired along previous lines (or information representative of the acceptability of the data so acquired) may be displayed (spatially, in some cases) alongside information representative of the data just-acquired along the present line. The display of the information representative of acquired data and the acceptability of the acquired data may allow a user, such as an engineer, to understand the value of that data and may help in making decisions about further data acquisition in or around the same area as the previously acquired data (such as in, for example, operations 314, 316, and 324, described below). Operation 308 may, however, be skipped in some embodiments (such as in an automated system) and in these cases, flow may proceed from operation 306 (or 304) directly to 310. In still other embodiments, information representative of the position and seismic data may be displayed prior to the acceptability computations in operation 306.

In operation 310, one or more prevailing conditions may be analyzed, and/or one or more factors that may (or will) impact the quality of the yet-to-be-acquired seismic data for one or more potential target lines may be predicted. The prevailing conditions may be referred to as "observed factors" and/or as "simple factors," and may include prevailing weather conditions, real-time sea current information, prevailing noise conditions (due to, for example, water swell, weather, other vessels, etc.), equipment conditions, the experience level of the crew on-board the vessel, known acquisition geometry, operational restrictions, the size, shape, speed (raw speed and turning speed), and type of vessel and/or streamers or other acquisition equipment used, environmental information, and so forth. The factors that will impact acquisition of the yet-to-be-acquired seismic data may be referred to as "predicted" or "interim" factors, and may include: predicted sea currents, predicted weather, predicted swell noise, predicted seismic interference, predicted noise created by nearby vessels or oil rigs or other bodies, other types of predicted noise, predicted acquisition geometry, predicted streamer feather, and so forth.

The likely occurrence, magnitude, frequency, and so on for these various predicted factors may be predicted by many different techniques with many different inputs. For example, historical and/or live weather data and/or historical and/or live sea current data may aid predicting future weather and predicting future sea currents, which may in turn aid in predicting future streamer feather. As another example, previously acquired seismic data (possibly nearby the one or more potential target lines) may be used to help make the predictions in operation 310. Many other sources of live and/or historical data may be used to help predict the predicted factors that will impact the acquisition of the seismic data. Note that some of the factors impacting acquisition of seismic data may be more amenable to prediction than others. Various factors can impact acquisition of seismic data in several different ways, including impacting the likely image quality (including coverage, noise, repeatability), the time it will likely take to acquire the seismic data in a specific location, the risks and benefits of acquiring seismic data in a specific location, and so forth.

The observed and/or the predicted factors may be analyzed and/or predicted with respect to one or more specific positions or locations in some embodiments, or may be analyzed and/or predicted with respect to one or more specific times. Factors that impact the acquisition of seismic data may be predicted for any number of potential target line(s); for example, factors may be predicted for one line, five lines, ten lines, or even one hundred or more potential target lines. The lines may be in the same general area (as shown in FIG. 2), or may be in distant locations one from another. Also, potential future factors may be predicted for a selectable future time window. For example, conditions and factors may be predicted for later in the same day, the next day, a week out, and so forth. In general, the predicted factors may be provided for many different time and spatial windows.

Furthermore, the predictions of operation 310 may combine both a time window and a defined spatial area or location—for example, operation 310 may involve predicting conditions and factors in a first area on a first and a second day, predicting conditions and factors in a second area on a first day and a second day, all in order to determine an acquisition plan or strategy indicated in which areas to acquire data in during the respective first and second days that will most likely result in the best data being obtained at the lowest cost, or may help prioritize seismic data acquisition for a plurality of lines or locations. Of course, the predictions may involve significantly more areas and significantly more time windows. Also, as an actual acquisition progresses, the predictions may change, and therefore the prediction in operation 310 may be a continuous and/or iterative process, which may result in the operations following operation 310 (such as the modeling in operation 312, described in more detail below) also being continuous and/or iterative.

Once one or more factors impacting image quality have been or are in the process of being predicted for one or more potential target lines, per operation 310, the acquisition of the those potential target lines may be modeled in operation 312. Modeling may occur concurrently with the prediction of the one or more factors, it may wait until all of the factors for one potential target line are predicted, it may wait until all of the factors for all of the potential target lines are predicted, it may wait until one factor is predicted for all of the potential target lines, etc. Modeling the acquisition of one or more potential target lines may include predicting or generating seismic attributes and statistics for the target lines to be acquired based on the observed factors, the predicted factors, positional information, and so forth. The seismic attributes and/or statistics predicted or generated may be referred to as "modeled attributes," and may include image quality attributes (including coverage, noise, repeatability, etc.), the time it will likely take to acquire the seismic data in a specific location, the risks and benefits of acquiring seismic data in a specific location, and so forth.

Modeling the acquisition may involve assigning weights to various predicted and/or observed factors, and/or may involve calculating a level of confidence in the modeled attributes. As part of assigning weights, for example, the amenability of the factor to prediction may be considered; for example, if a factor is difficult to predict, then a lower weight may be assigned to it, whereas if a factor can be predicted with relative certainty, a higher weight may be assigned to it.

Furthermore, the modeling of operation 312 may combine a time window and a defined spatial area or location—for example, operation 312 may involve modeling acquisition in a first area on a first and a second day, modeling acquisition in a second area on a first day and a second day, all in order to determine an acquisition strategy or plan indicated in which areas to acquire data in during the respective first and second days that will most likely result in the best data being obtained at the lowest cost, or may help prioritize seismic data acquisition for a plurality of lines or locations. Of course, the modeling may involve significantly more areas and significantly more time windows. Also, as an actual acquisition progresses, the predictions may change, and therefore the modeling in operation 312 may be a continuous and/or iterative process, which may result in the operations following operation 312 also being continuous and/or iterative.

During or after the modeling of the acquisition of the multiple potential target lines in operation 312, the benefit of acquiring seismic data along one or more of the lines may be quantified in operation 314. This quantification may involve weighing the benefit(s) of acquiring seismic data along a particular line against the cost of doing so. It may also involve comparing the benefit of acquiring seismic data along one line versus the benefit of acquiring seismic data along a different line, or may involve quantifying the absolute benefit to acquiring seismic data along one line at all, or it may involve both. Such quantification may allow a user or an automated system to determine whether to acquire seismic data along the first line or the second line, or whether to acquire seismic data along any line(s) at all. In some cases, such as where acquiring an infill line is being contemplated, operation 314 may involve weighing the benefit of acquiring the additional data with the cost of acquiring seismic data along the line again. For example, if acquiring infill data along a line will only improve image quality by 10% but will cost ten thousand dollars, the infill acquisition may not be worth the additional cost. As another example, if the weather and sea currents are relatively calm, it may be more beneficial to conduct a primary acquisition of a line (e.g., the first pass along a line to acquire seismic data) than to conduct an infill acquisition along a different line because the infill process may not be as sensitive to quality control issues as the primary acquisition process.

At operation 316, a user or automated system may determine whether to acquire seismic data along any of the multiple potential target lines. Such a determination may be made, for example, within a few minutes up to an hour or two after completing the acquisition of seismic data along one line in order to decide in which direction to steer the vessel. In other cases, such a determination may be made even before acquisition of seismic data along a present line is complete. Factors that may be considered during such a determination include the quantified benefits determined in operation 314, the models of the potential acquisition lines from operation 312, the observed factors, the predicted factors from operation 310, the acceptability of the data calculated in operation 306, the acquired data itself from operation 304, previously acquired data (that may have been displayed, for example, in operation 308), the requirements of the survey or of the customer, and so forth. If it is determined to not acquire seismic data along any of the multiple potential target lines, the process stops in operation 320. If it is determined that seismic data should be acquired along at least one of the multiple potential target lines, it is determined in operation 324 which of the multiple potential target lines is the "best" candidate for acquisition of seismic data. As with operation 316, many factors including those listed above may influence the determination of which of the multiple target lines is the "best" candidate for acquisition. The vessel may then steer towards the selected line, and the operations 300 begin again at operation 304 as indicated in FIG. 3.

Note that the operations 300 have been explained to describe one possible method for determining a location in which to acquire seismic data in a marine context. Many of the operations described above, however, may be skipped or reordered. For example, as previously mentioned, the acquired data and the acceptability of that data may not necessarily be displayed in operation 308. As another example, flow may proceed from operation 310 (predicting factors) directly to operation 314 (quantifying the benefit), skipping the need to model the acquisition of the multiple potential target lines. Also, flow may proceed from operation 312 (or even from operation 310) directly to operation 316. In some embodiments, the operations 300 may be conducted in real-time or near real-time as acquisition of seismic data is taking place. Also, although the operations 300 have been described in the context of acquisition by towed streamers in the ocean, the concepts described above are more generally applicable, such as to land-based seismic surveys with any appropriate modifications.

Figure 4:
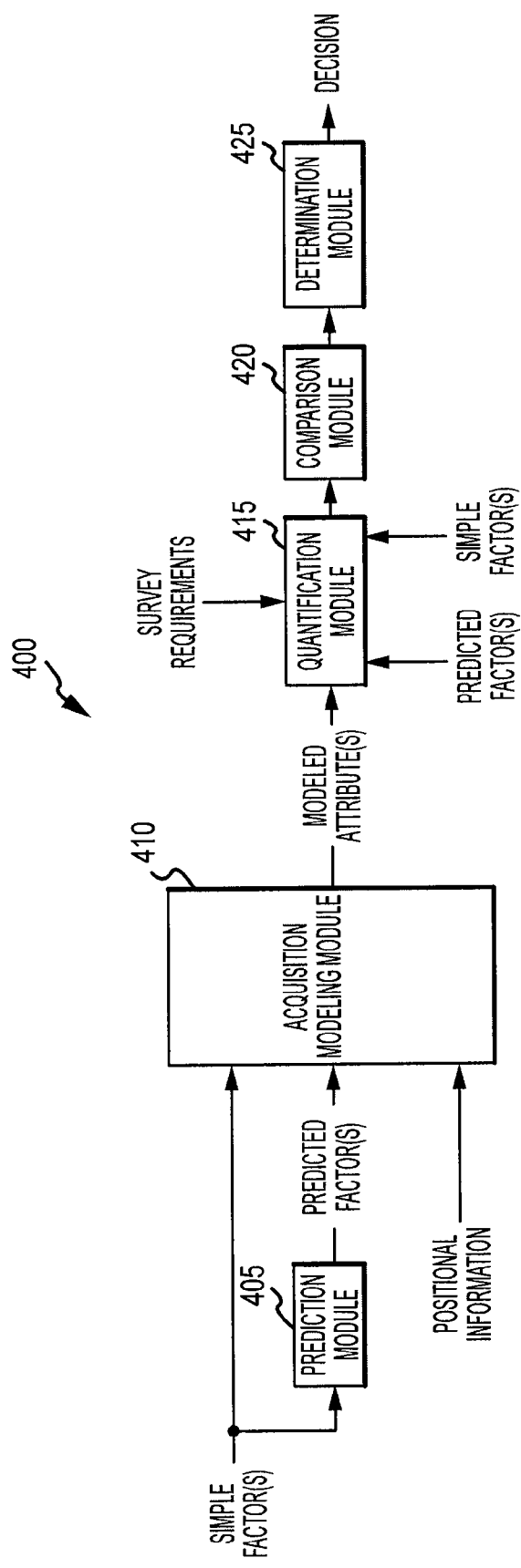
FIG. 4 is a block diagram of a system for determining a location to acquire seismic data.

FIG. 4 illustrates a system 400 that may be used to determine a location in which to acquire geophysical data. For example, the system 400 may be used to carry out the operations 300 described with reference to FIG. 3 and/or to carry out the operations 500 described with reference to FIG. 5. The system 400 includes a prediction module 405, which is coupled to an acquisition modeling module 410, which is coupled to a quantification module 415, which is coupled to a comparison module 420, which is coupled to a determination module 425. In some embodiments, one or more of the modules 405, 410, 415, 420, 425 may be omitted.

With reference to FIG. 4, one or more simple factor(s) may be provided to the prediction module 405, to the acquisition modeling module 410, and/or to the quantification module 415. The simple factor(s) may include, for example, prevailing weather conditions, prevailing sea currents, known acquisition geometry, operational restrictions (a spatial location in which a platform or other obstruction temporarily or indefinitely excludes acquisition), crew experience level, type (e.g., size, brand, weight, etc.) of equipment (including vessel, streamers, etc.), environmental data, previously acquired seismic data from the same location, and so forth. The simple factor(s) may be observed (e.g., measured) in some embodiments.

The prediction module 405 may receive the simple factor(s) and may generate, in response, one or more predicted factor(s). The predicted factor(s) may include, for example, predicted weather conditions, predicted sea currents, predicted streamer feather, predicted acquisition geometry, and so forth. The prediction module 405 may provide the predicted factor(s) over one or more designated time periods and for one or more designated spatial locations. The prediction module 405 may include some iteration, for example, predicted sea currents may inform predicted streamer feather. Furthermore, the prediction module 405 may run in real-time or near real-time such that the predicted factor(s) provided by the prediction module 405 may be updated as a seismic survey progresses and/or as new simple factor data is provided to the prediction module 405.

The acquisition modeling module 410 may receive the simple and/or the predicted factor(s) along with positional information and may generate, in response, one or more modeled attribute(s). The modeled attributes may be relatively complex, and may include attributes relating to image quality (e.g., bin coverage, repeatability such as $d_{src}+d_{rx}$, noise, etc.), attributes relating to time needed to acquire the seismic data in the first location, risks and costs of acquiring the seismic data in the first location, and so forth. The acquisition modeling module 410 may generate the modeled attribute(s) by modeling acquisition of seismic data in a first location based on one or more of the simple and/or predicted factor(s) that impact acquisition of seismic data in the first location. The acquisition modeling module may provide the modeled attribute(s) over one or more designated time periods and for one or more designated spatial locations—for example, the acquisition modeling module may provide the modeled attribute(s) for each of a plurality of potential acquisition locations such as sail lines. The acquisition modeling module 410 may include some iteration, and may run in real-time or near real-time such that the modeled attribute(s) may be updated as a seismic survey progresses and/or as new simple and/or predicted factor data is provided to the acquisition modeling module 410.

The quantification module 415 may receive one or more modeled attribute(s) from the acquisition modeling module, and may also receive one or more simple factor(s) and/or one or more predicted factor(s). Furthermore, the quantification module 415 may receive survey requirements that are provided, for example, by a customer. The quantification module 415 may provide benefit information (with such benefit information also including risks, costs, and so forth) of acquiring seismic data along each of a plurality of potential lines or other locations to a comparison module 420.

In some embodiments, one of the factors and/or attributes provided to the quantification module 415 may include information about a reservoir (e.g., the reservoir 105 in FIG. 1B). Such reservoir information may include historical data representative of the reservoir (e.g., previous seismic survey information for the reservoir), information representative of the predicted or expected state of the reservoir (e.g., predicted changes in the reservoir since a baseline seismic survey), and so forth. The reservoir information may be used by the quantification module, along with the one or more modeled attribute(s) and/or simple or predicted factors, in order to optimize acquisition of seismic data near the reservoir. For example, if the change in the reservoir is predicted to be small, the monitoring acquisition may need to be relatively controlled and precise in order to detect the subtle changes in the reservoir. On the other hand, if the reservoir is predicted to change substantially, the monitoring acquisition may be relatively coarsely designed. In general, many reservoir-related factors and attributes may be used to help plan an efficient survey near the reservoir.

The comparison module 420 may be coupled to the determination module 425, which may be an automated module (e.g., makes a determination without any input from a user such as an engineer), or which may be a module that receives input from a user. The determination module provides a decision of a location in which to acquire seismic data.

Figure 5:
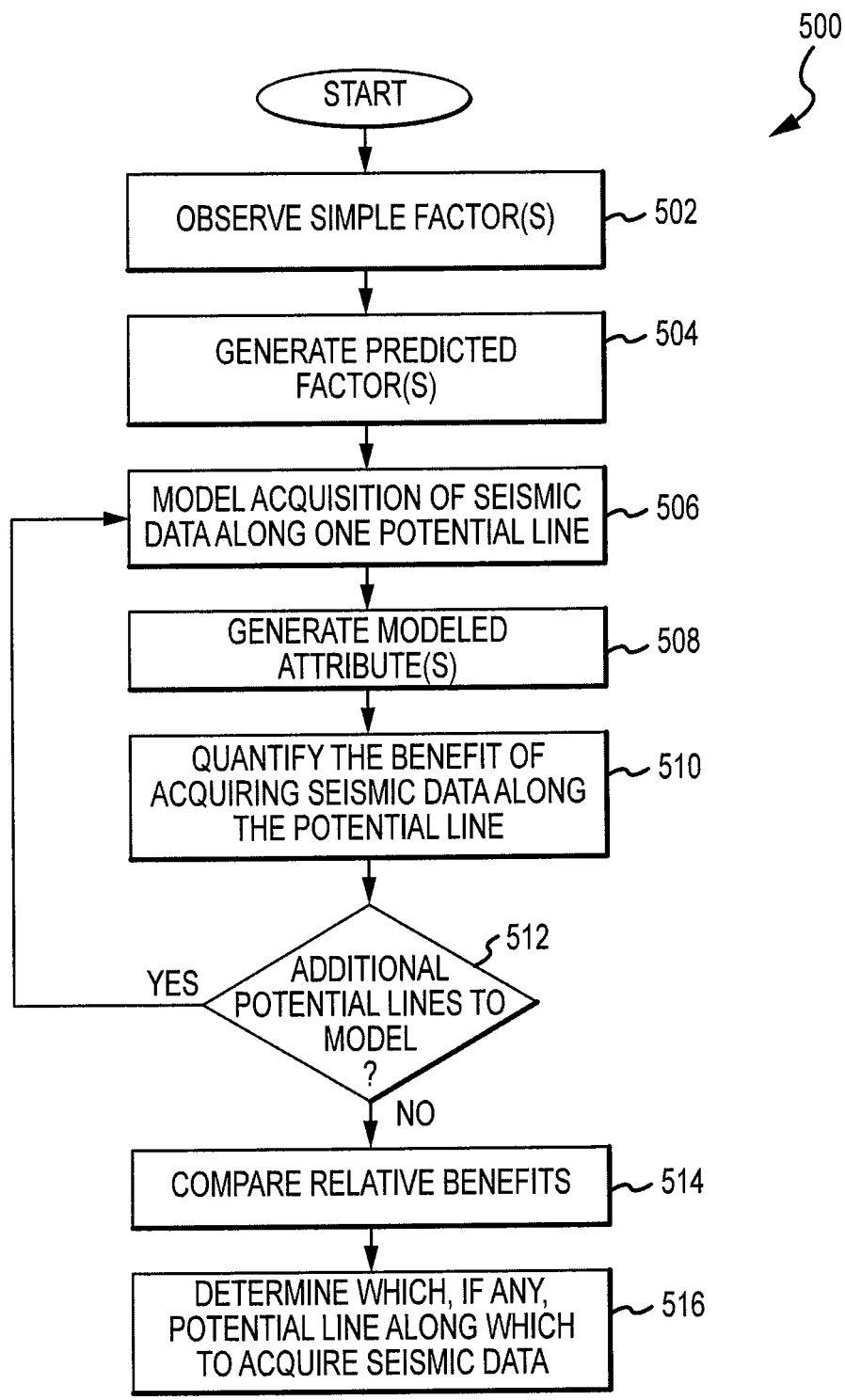
FIG. 5 is a flowchart of a method for determining a location to acquire seismic data.

FIG. 5 is a flowchart illustrating a system and method for determining a location to acquire seismic data. Operations 500 may, for example, facilitate determining which, if any, of the potential target lines in FIG. 2 the vessel 201 should travel along in order to acquire seismic data after completing acquisition (or even during acquisition) along line 212. In general, the operations 500 shown in FIG. 5 may in many respects be similar to the operations 300 shown in FIG. 3. The operations 500 may be carried out by the system illustrated in FIG. 4 in some embodiments.

In operation 502, one or more simple factor(s) are observed, such as the simple factor(s) described above with reference to FIG. 3 or FIG. 4. In operation 504, one or more predicted factors are generated, such as in the prediction module 405 in FIG. 4. In operation 506, the acquisition of seismic data along one potential line is modeled, based on one or more of the predicted and/or simple factor(s) that impact acquisition of seismic data along the potential line. In some embodiments, the acquisition is modeled with respect to positional information of the potential line that is provided to, for example, the acquisition modeling module 410 illustrated in FIG. 4. In operation 508, one or more modeled attributes are generated based at least in part on the modeling of operation 506.

In operation 510, the benefit of acquiring seismic data along the potential line is quantified, which operation may be performed for example by the quantification module 415 in FIG. 4. As described above, the quantification of the benefit may include consideration of one or more modeled attribute(s), one or more simple factor(s), one or more predicted factor(s), survey requirements, and so forth.

In operation 512, a determination is made whether acquisition of seismic data along additional lines or other locations should be modeled. If so, flow returns to operation 506 where another potential line is modeled based on one or more simple factor(s) and/or one or more predicted factor(s). If no additional lines or other locations need to be modeled, flow continues to operation 514, where the relative benefits of acquiring seismic data along each of the plurality of lines that were modeled are compared. The benefits may be compared to one another, but also may be evaluated individually and/or compared against some threshold or matrix value. In operation 516, a determination is made of which, if any, potential line along which seismic data should be acquired. In this manner, the operations 500 help determine a location in which to acquire seismic data.

As with FIG. 3 discussed above, note that the operations 500 described in FIG. 5 have been explained to describe one possible method for determining a location in which to acquire or to continue/discontinue acquiring seismic data in a marine context. Many of the operations described above, however, may be skipped or reordered. Also, although the operations 500 in FIG. 5 have been described in the context of acquisition by towed streamers in the ocean, the concepts described above are more generally applicable, such to in land-based seismic surveying. Furthermore, while the operations 500 shown in FIG. 5 do not include a spatial display of attribute or factor information, the operations 500 may be modified to include such operations.

FIG. 6 is a spatial plot showing both information representative of previously acquired seismic data from completed lines as well as information representative of seismic data that a vessel 640 is presently in the process of acquiring along the present line 620. Similar to FIG. 2, the vessel 640 may be acquiring the data in a racetrack manner, in a modified racetrack manner that may result from following the operations 300 described above with reference to FIG. 3, as a result of following the operations 500 described above with reference to FIG. 5, or as a result of following operations 700 described below with reference to FIG. 7. Unlike FIG. 2, however, FIG. 6 shows a spatial plot of information representative of the quality of the data recorded along several lines 630, 632, 634, 636, 638 acquired during a seismic survey, as well as information representative of the quality of the data on a line 620 that the vessel 640 is presently in the process of acquiring.

The shading in FIG. 6 represents the relative quality of the acquired data, where darker shading indicates good quality and light shading indicates poor quality. As can be appreciated from inspection of FIG. 6, the data that was acquired along lines 630 and 632 was of relatively good quality. As shown in FIG. 6, the vessel 640 may be acquiring data along line 620 for the first time in what may be referred to as a primary acquisition, and the data that vessel 640 is acquiring may be poor quality, perhaps because of stormy weather conditions or strong sea currents. If a user or automated system analyzes the spatial plot shown in FIG. 6 as the vessel 640 is acquiring line 620, a decision may be made to acquire data in a different location due to the bad weather conditions and poor quality of the data being acquired. This decision may be based, at least in part, on a desire to acquire relatively good quality data during the primary acquisition along line 620. If a determination is made to terminate acquisition of data along line 620, the vessel 640 may continue acquiring data in a different location. For example, the vessel 640 may acquire infill data (which may not be as sensitive of an acquisition process to quality control issues as a primary acquisition process), along the remaining portion of line 634 in order to fill in gaps or imperfections in the data already acquired along that line. As with FIG. 2, the previously acquired lines and the presently being acquired line in FIG. 6 are merely given as an example, and many other paths for the vessel 640 are possible.

FIG. 6 illustrates a single layer of information that is representative of seismic data, such as quality control information. However in some embodiments, the spatial plot may include multiple layers of information. For example, a top layer may be representative of a combination of several types of quality control information, a second layer may be representative of bin coverage, a third layer may be representative of the Root Mean Square (RMS) of a seismic signal, a fourth layer may be representative of the RMS of noise, and so forth. A user viewing the spatial play may chose to display or hide one or more layers.

Figure 7:
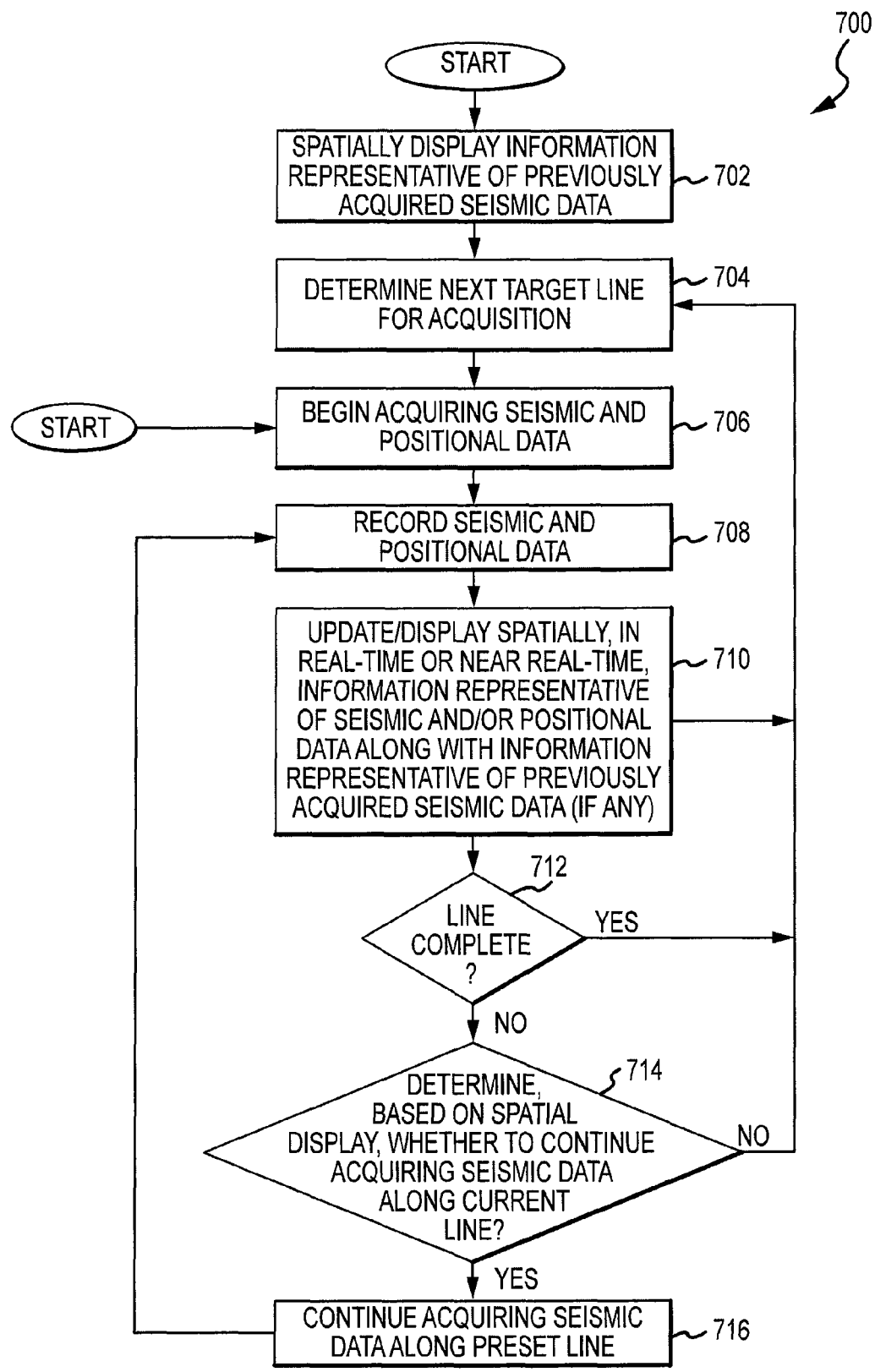
FIG. 7 is a flowchart of a method for determining a location to acquire seismic data.

FIG. 7 is a flowchart illustrating an embodiment of a system and method for determining a location to acquire seismic data. Operations 700 may, for example, facilitate determining whether to continue acquiring seismic data along a present line or to move to a different location. As will be described in more detail below, having a spatial display of information representative of the quality of seismic data along previously acquired lines along with information representative of the quality of seismic data along the presently being acquired line may allow a user or system to dynamically determine or plan specific locations for acquiring seismic data. This may also allow a user or automated system to view a spatial representation of how quality has varied across a survey area, as well as to improve the efficiency and effectiveness of a seismic data acquisition survey.

Note that operations 700 may begin at either operation 702, or at operation 706. In operation 702, previously acquired seismic data is spatially displayed. This display may be similar to the spatial plot shown in FIG. 6, and may display information representative of the quality of data previously acquired. As described above, the data may be displayed as layers and may include attributes such as fold of coverage, Root Mean Square (RMS) of a seismic signal, RMS of signal noise, signal-to-noise ratio, source/gun volume, repeatability, and so forth. Each attribute may be displayed as a separate layer in the spatial display, and/or the attributes may be weighted and combined to give an overall quality control value for data at each location.

In some cases, each point of data in the spatial display may be representative of a source fired at that location, with the data from the different receivers on different streamers being summed and averaged. So for example, a data point at location x, y may be representative of a source that was fired at the coordinate associated with x, y and may be calculated by combining quality control data from all of the reflections of that source shot "heard" by all of the receivers. There are also many other ways of calculating data values at each point. In some embodiments, each point of data in the spatial display may be representative of a seismic signal received at that location, or may be representative of a common midpoint (CMP) at that location, and so forth.

If a user selects a particular point of data in the spatial display, the user may be able to see all of the data associated with that particular location. For example, if a user selects the point associated with location x, y, the user may be shown the RMS of the signal at that location, the RMS of the signal noise at that location, the source or gun volume at that location, the individual signals received by each receiver associated with the shot emitted at that location, and any other seismic data, positional data, or quality control data, and so forth.

In operation 704, a target line for acquiring seismic data is determined according to an acquisition plan (where the acquisition plan may be a proposed course for the vessel 640 to follow). In some cases, the acquisition plan may be based on the spatial display of previously acquired data discussed with respect to operation 702. In other cases, this acquisition plan may be based on the area required to be surveyed by a customer. In still other cases, the acquisition plan may be made as a result of following the operations 300 described above with reference to FIG. 3 or as a result of following the operations 500 described above with reference to FIG. 5. In general, the acquisition plan may be any type of predetermined and/or proposed course for the vessel 640 to follow, and the acquisition plan may be predetermined well in advance of the planned acquisition or may be predetermined shortly before the planned acquisition. In some embodiments, the acquisition plan may evolve and change during the planned acquisition, as described herein.

Once a target line is selected according to the acquisition plan, the survey may begin, and a vessel (e.g. the vessel 640 illustrated in FIG. 6) may begin acquiring seismic data and positional data substantially along the target line in operation 706 (similar to operation 304 discussed above in connection with FIG. 3). Once the vessel begins acquiring seismic and positional data, that data may be recorded in a storage medium (e.g., such as in mass storage 842 or main memory 845 shown in FIG. 8 below), and the seismic and positional data may be recorded either separately or together, per operation 708.

As the seismic and positional data is being acquired and recorded (e.g., in real-time) or shortly thereafter (e.g., in near real-time), that data may be combined and/or analyzed, and information representative of such may be spatially displayed in operation 710. The seismic and positional data may be combined because a spatial display requires both a location and a value of data for that location. In the event that there is previously acquired data, information representative of the previously acquired data may be displayed concurrently with information representative of the data presently being acquired (as in FIG. 4), possibly as an overlay. Alternatively, the data presently being acquired, or the quality of that data, may be tested against some predetermined threshold or acceptable value for analysis by an automated system. For example, if the quality of data presently being acquired is below the predetermined threshold or acceptable value, an alarm may sound to alert an engineer to the poor quality of the data.

The data may be spatially displayed in any of a variety of mediums. For example, the spatial display may be on a computer monitor (LCD, CRT, HDTV, etc.) in some embodiments. In other embodiments, the spatial display may be embodied on a piece of paper printed out from a printer, may be embodied on a tablet or notebook computer, may be embodied in a smartphone or other electronic device, and so forth. In some embodiments, the spatial display may be a holographic or any type of three-dimensional display. In general, the spatial display of data may take one of many different suitable forms.

After the data is displayed and/or as it is being updated in operation 710, it is determined whether acquisition along the line is complete in operation 712. If acquisition along the line is complete, flow returns to operation 704 where the next target line for acquisition is determined, which determination may be based on the acquisition plan. If acquisition along the line is not complete, flow proceeds to operation 714, where it is determined, based on the spatial display, whether to continue acquisition of seismic data along the present line as per the acquisition plan, or whether the acquisition plan should be altered. For example, if the spatial display shows that the seismic data acquired along lines on both or either side of the presently being acquired line produced high quality data, but the presently being acquired line is producing poor quality data, it may be determined to terminate acquisition along the presently being acquired line, and start acquiring seismic data in a different location. If it is determined to continue acquiring seismic data along the present line, acquisition continues in operation 716 and flow returns to operation 708. If it is determined to discontinue acquiring seismic data along the present line, flow returns to operation 704, where the next target line (or portion of line) along which seismic data is to be acquired is determined.

In some embodiments, the determination in operation 714 may be made by a user, such as an engineer, after consulting the information spatially displayed in operation 710. In other embodiments, however, the determination in operation 714 may be automated by a computer or artificial intelligence system. Such an automated system may make the determination in operation 714 based on a substantially reduced set of data (as compared with the seismic data recorded in operation 708), for example based on the data necessary to spatially display information representative of the seismic data. In some embodiments, the determination 714 may be a hybrid determination; for example, an automated system may trigger an alert to an engineer or other user with one or more proposed courses of action, but the ultimate determination may be left to the discretion of the engineer.

As with FIGS. 3 and 5 discussed above, note that the operations 700 described in FIG. 7 have been explained to describe one possible method for determining a location in which to acquire or to continue/discontinue acquiring seismic data in a marine context. Many of the operations described above, however, may be skipped or reordered. Also, although the operations 700 in FIG. 7 have been described in the context of acquisition by towed streamers in the ocean, the concepts described above are more generally applicable, such as to land-based seismic surveying.

Figure 8:
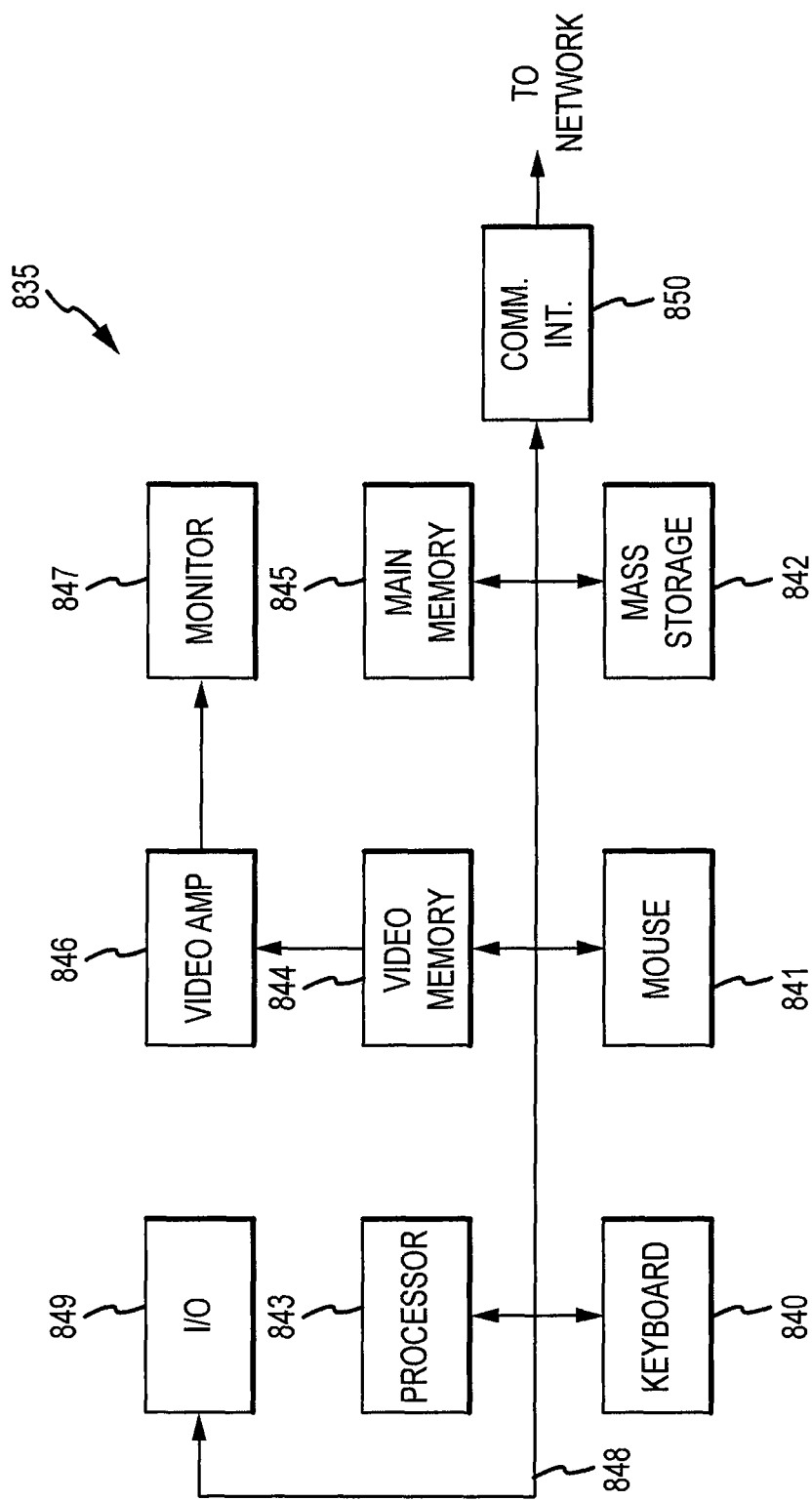
FIG. 8 illustrates an embodiment of a computer system capable of carrying out the methods of any of FIGS. 3, 5, and/or 7, and/or capable of embodying the system of FIG. 4.

FIG. 8 illustrates an embodiment of a computer system 835 capable of determining a location in which to acquire seismic data, including for example, a system capable of executing the operations in FIGS. 3, 5 and/or 7, and/or capable of embodying the system in FIG. 4. In some embodiments, the computer system 835 may be a personal computer and/or a handheld electronic device. In other embodiments, the computer system 835 may be an implementation of enterprise level computers, such as one or more blade-type servers within an enterprise. In still other embodiments, the computer system 835 may be any type of server. The computer system 835 may be onboard a vessel (such as vessel 101 shown in FIGS. 1A and 1B), may be on a remotely controlled drone vessel, may be on land in a vehicle, may be in land in a facility, or any other place.

A keyboard 840 and mouse 841 may be coupled to the computer system 835 via a system bus 848. The keyboard 840 and the mouse 841, in one example, may introduce user input to the computer system 835 and communicate that user input to a processor 843. Other suitable input devices may be used in addition to, or in place of, the mouse 841 and the keyboard 840. An input/output unit 849 (I/O) coupled to the system bus 848 represents such I/O elements as a printer, audio/video (A/V) I/O, etc.

Computer 835 also may include a video memory 844, a main memory 845 and a mass storage 842, all coupled to the system bus 848 along with the keyboard 840, the mouse 841 and the processor 843. The mass storage 842 may include both fixed and removable media, such as magnetic, optical or magnetic optical storage systems and any other available mass storage technology. The bus 848 may contain, for example, address lines for addressing the video memory 844 or the main memory 845.

The system bus 848 also may include a data bus for transferring data between and among the components, such as the processor 843, the main memory 845, the video memory 844 and the mass storage 842. The video memory 844 may be a dual-ported video random access memory. One port of the video memory 844, in one example, is coupled to a video amplifier 846, which is used to drive one or more monitor(s) 847. The monitor(s) 847 may be any type of monitor suitable for displaying graphic images, such as a cathode ray tube monitor (CRT), flat panel, or liquid crystal display (LCD) monitor or any other suitable data presentation device. The monitor(s) 847 may be used in operations 308, 702, 710, etc. to display information representative of seismic data, seismic quality control data, acceptability of seismic data, and so forth, such as in FIG. 4.

The computer system includes a processor 843, which may be any suitable microprocessor or microcomputer. The computer system 835 also may include a communication interface 850 coupled to the bus 848. The communication interface 850 provides a two-way data communication coupling via a network link. For example, the communication interface 850 may be a satellite link, a local area network (LAN) card, a cable modem, and/or wireless interface. In any such implementation, the communication interface 850 sends and receives electrical, electromagnetic or optical signals that carry digital data streams representing various types of information.

Code received by the computer system 835 may be executed by the processor 843 as the code is received, and/or stored in the mass storage 842, or other non-volatile storage for later execution. In this manner, the computer system 835 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 835, the data processing system may execute operations that allow for determining a location in which to acquire seismic data as described above for example with reference to FIGS. 3, 4, 5, and 7.

The apparatuses and associated methods in accordance with the present disclosure have been described with reference to particular embodiments thereof in order to illustrate the principles of operation. The above description is thus by way of illustration and not by way of limitation. Various modifications and alterations to the described embodiments will be apparent to a person of skill in the art in view of the teachings herein. For example, under the teachings of the present disclosure a person of skill in the art may be able to devise numerous systems, arrangements and methods which, although not explicitly shown or described herein, embody the principles described and are thus within the spirit and scope of this disclosure. Such systems, arrangements and methods may include combinations of the various embodiments described herein. For example, as mentioned above, although the operations 500 shown and described with reference to FIG. 5 do not include an operation of spatially displaying relevant data or information, the operations 500 may be modified to include such (e.g., modified to include the operations 700 shown and described with reference to FIG. 7). Many other modifications, combinations, and other arrangements are similarly possible and within the spirit and scope of the present disclosure. Accordingly, it is intended that all such alterations, variations, and modifications of the disclosed embodiments are within the scope of this disclosure as defined by the appended claims.

As another example of a possible modification, although the present disclosure refers to "lines" along which seismic data may be acquired, it will be understood that seismic data may be acquired in any type or shape of location, and, accordingly, the apparatuses and methods disclosed herein my be used to predict factors for any type or shape of location, model acquisition of seismic data in any type or shape of location, and so forth, with a "line" being one specific example of a type and shape of location in a marine-based seismic survey. Furthermore, "line" and "portion of line" may refer to any length within the sea, and may refer to an identical location in some embodiments.

In addition, in methodologies directly or indirectly set forth herein, various steps and operations may be described in one possible order of operation, but those skilled in the art will recognize that the steps and operations may be rearranged, replaced, or eliminated without necessarily departing from the spirit and scope of the disclosed embodiments.

All relative and directional references (including: north, south, west, east, top, bottom, upward, downward, side, above, below, and so forth) are given by way of example to aid the reader's understanding of the particular embodiments described herein. They should not be read to be requirements or limitations, particularly as to the position, orientation, or use of the invention. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A method, comprising:
    modeling acquisition of seismic data in a first location along a sail line from an acquisition plan, based on a first factor that impacts acquisition of the seismic data in the first location;
    generating a modeled attribute based on the modeling;
    quantifying a first benefit of acquiring seismic data in the first location based on the modeled attribute;
    determining whether to acquire the seismic data in the first location based on the modeled attribute and the first benefit;
    acquiring seismic data in the first location along the sail line by emitting seismic waves from a source, wherein the seismic waves reflect off a subsurface;
    measuring the reflected seismic waves in a receiver; and
    determining whether to alter the acquisition plan based on the modeling during acquisition of seismic data along the sail line, before acquisition of the seismic data long the sail line is complete.

2. The method of claim 1, wherein the modeled attribute includes predicted image quality of the seismic data acquired in the first location or predicted acquisition success of the seismic data acquired in the first location.

3. The method of claim 1, wherein the modeled attribute includes a predicted amount of time to acquire the seismic data in the first location.

4. The method of claim 1, wherein the modeled attribute is generated with respect to positional information of the first location stored on a vessel towing the receiver along the sail line.

5. The method of claim 1, wherein the modeled attribute is further based on an observed factor selected from prevailing weather conditions, real-time sea current information, and experience level of a crew on board a vessel acquiring the seismic data along the sail line.

6. The method of claim 1, wherein the modeled attribute includes a repeatability attribute comprising a sum of source and receiver distances.

7. The method of claim 1, wherein the modeled attribute comprises image quality and includes a bin coverage attribute relating to the image quality.

8. The method of claim 1, wherein the modeled attribute includes a noise attribute including predicted noise created by nearby vessels or oil rigs.

9. The method of claim 1, wherein the determination of whether to acquire seismic data in the first location is further based on an observed factor selected from prevailing noise conditions due to other vessels and operational restrictions temporarily excluding acquisition of the seismic data along the sail line.

10. The method of claim 1, wherein determining whether to alter the acquisition plan is further based on information about a reservoir proximate a location from which the seismic waves were reflected.

11. The method of claim 10, wherein the information about the reservoir includes historical data including previously acquired seismic data representative of the reservoir and data representative of predicted changes in the reservoir.

12. A method, comprising:
    modeling acquisition of seismic data in a first location along a first sail line of a vessel based on a first factor that impacts acquisition of seismic data in the first location;
    quantifying a first benefit of acquiring seismic data in the first location based on the modeling;
    determining whether to acquire seismic data in the first location based on the first benefit;
    acquiring seismic and positional data along the first sail line of the vessel;
    modeling acquisition of seismic data in a second location along a second sail line of the vessel based on a second factor that impacts acquisition of seismic data in the second location;
    quantifying a second benefit of acquiring seismic data in the second location;
    selecting the second location to acquire seismic data during acquisition along the first sail line, based on comparing the first and second benefits; and
    acquiring seismic and positional data along the second sail line of vessel.

13. The method of claim 12, wherein the first benefit is further quantified based on the first factor to determine whether to acquire seismic data along the first sail line of the vessel or the second sail line of the vessel, wherein acquiring an infill line is contemplated, and further comprising weighing the second benefit of acquiring additional seismic data along the second sail line of the vessel with a cost of acquiring seismic data along the first sail line of the vessel again.

14. The method of claim 12, wherein the first factor includes a predicted factor selected from predicted sea currents, predicted weather, predicted swell noise, predicted seismic interference, predicted noise, predicted acquisition geometry, and predicted streamer feather.

15. The method of claim 12, wherein the first factor includes seismic data that has previously been recorded along the first sail line of the vessel and that is representative of the first location.

16. The method of claim 12, wherein the first factor includes an operational restriction comprising a spatial location in which an obstruction temporarily excludes acquisition of seismic and positional data along the first sail line of the vessel.

17. The method of claim 12, wherein the first location is along a first planned sail line of a vessel and the second location is along a second planned sail line of the vessel, each of the first planned sail line and the second planned sail line comprising a planned course for the vessel to sail.

18. The method of claim 12, wherein the modeling is further based on a simple factor that impacts acquisition of seismic data in the first location, the simple factor selected from prevailing weather conditions, real-time sea current information, prevailing noise conditions, operational restrictions and experience level of a crew on board the vessel.

19. The method of claim 12, further comprising:
modeling acquisition of seismic data in a plurality of locations along a plurality of planned sail lines of the vessel; and
prioritizing acquisition of seismic data in the plurality of locations based on the modeling in a continuous and iterative process, wherein predicted sea currents inform predicted streamer feather along the plurality of planned sail lines.

20. A method, comprising:
predicting a first factor that impacts acquisition of seismic data in a first location along a present line;
modeling acquisition of seismic data in the first location along the present line, the modeling reflecting the predicted first factor;
analyzing a second factor that impacts acquisition of seismic data in a second location along a different line, wherein the modeling further reflects the second factor; and
determining whether to acquire seismic data in the first second location along the different line based on the modeling during acquisition of seismic data along the present line, before acquisition of seismic data along the present line is complete.

21. The method of claim 20, wherein the determining is based on both the predicted first factor and also based on the modeling and further comprising:
terminating the acquisition of seismic data in the first location along the present line; and
continuing the acquisition of seismic data in a second location along a different line.

22. The method of claim 20, further comprising:
analyzing a predicted factor that impacts presently being acquired seismic data along the present line, wherein the modeling further reflects the predicted factor.

23. The method of claim 20, wherein the first factor is selected from the group consisting of known obstructions, known operational restrictions, crew experience level and previously acquired seismic data from a same location along the present line.

24. The method of claim 20, further comprising:
spatially displaying information on a spatial plot showing information representative of previously acquired seismic data from completed lines as well as information representative of presently being acquired seismic data along the present line;
analyzing the spatial plot as a vessel is acquiring the present line;
making a decision to acquire seismic data in the second location along the different line during acquisition along the present line; and
continuing to acquire the seismic data in the second location, wherein the vessel terminates acquisition along the present line and acquires infill data to fill a gap in one of the completed lines before acquisition along the present line is complete.

25. The method of claim 20, wherein the first factor is predicted streamer feather informed by predicted sea currents.

26. The method of claim 20, further comprising:
generating a modeled attribute based on predicted image quality to be obtained during acquisition of the seismic data in the first location along the present line; and
calculating a level of confidence in the modeled attribute;
wherein the modeled attribute is selected from the group consisting of repeatability, noise, and coverage; and
wherein determining whether to acquire seismic data in the first location is further based on the modeled attribute.

27. A method, comprising:
acquiring seismic data in a first location according to an acquisition plan comprising a proposed course for a vessel towing a streamer;
recording a portion of the seismic data and corresponding positional data representative of the first location;
calculating quality control data corresponding to the portion of the seismic data recorded;
spatially displaying information representative of the quality control data based on the positional data along a line that the vessel is presently acquiring;
determining whether to alter the acquisition plan based on the information displayed during acquisition along the line;
terminating seismic data acquisition in the first location before acquisition along the line is complete, based on the information displayed along the line that the vessel is presently acquiring; and
acquiring seismic data in a second location along a different line, based on the information displayed.

28. The method of claim 27, further comprising:
spatially displaying information representative of previously acquired seismic data alongside information representative of data acquired along a present line; and
determining whether to acquire seismic data along a target line, before acquisition of seismic data along the present line is complete.

29. The method of claim 27, further comprising predicting conditions to prioritize acquiring the seismic data for a plurality of sail lines, wherein:
terminating seismic data acquisition in the first location comprises terminating the acquisition along one of the sail lines based on the information displayed; and
acquiring seismic data in a second location comprises acquiring infill data along another of the sail lines based on the information displayed.

30. The method of claim 27, wherein the information representative of the quality control data is displayed on a monitor wherein a spatial plot includes multiple layers of information selected from a top layer representative of the quality control information, a second layer representative of bin coverage, a third layer representative of an RMS seismic signal and a fourth layer representative of noise.

31. The method of claim 27, wherein the quality control data comprises a Root Mean Square (RMS) of a seismic signal received at the first location.

32. The method of claim 27, further comprising:
predicting a factor that impacts acquisition of seismic data, the factor selected from predicted sea currents, predicted weather, predicted swell noise, predicted seismic interference, predicted noise, predicted acquisition geometry and predicted streamer feather;
modeling acquisition of seismic data in the second location based on the factor, wherein the factor impacts acquisition of seismic data in the second location; and
generating a modeled attribute based on the modeling, the modeled attribute selected from image quality, time to acquire seismic data in the second location, and risks and benefits of acquiring seismic data in the second location.

33. The method of claim 32, further comprising:
spatially displaying information representative of the modeled attribute along with quality control data corresponding to the portion of the seismic data recorded.

34. The method of claim 4, wherein the first factor is predicted streamer feather and further comprising predicting sea currents to inform the predicted streamer feather.

35. The method of claim 4, further comprising:
determining whether to acquire seismic data along one or more of a plurality of potential target lines during acquisition of the seismic data long the sail line;
steering the vessel toward the selected target line; and
acquiring seismic data along the selected target line before acquisition of the seismic data along the sail line is complete.

36. The method of claim 12, wherein the second factor includes information comprising previous seismic survey information for a reservoir and information representative of predicted changes in the reservoir, and further comprising emitting seismic energy which reflects proximate the reservoir and is received at a streamer towed by the vessel.

37. The method of claim 20, wherein determining whether to acquire seismic data in the first location comprises terminating seismic data acquisition in the first location and acquiring seismic data in the second location before acquisition along the present line is complete.

38. The method of claim 27, further comprising:
automatically analyzing the information displayed as the vessel is acquiring the line; and
making a decision to acquire the seismic data in the second location along the different line due to poor quality of data along the line that the vessel is presently acquiring.

* * * * *